United States Patent [19]

Terashita et al.

[11] Patent Number: 4,816,874
[45] Date of Patent: Mar. 28, 1989

[54] EXPOSURE DETERMINING DEVICE FOR COLOR IMAGE REPRODUCTION

[75] Inventors: Takaaki Terashita; Takao Shigaki; Keiko Yukawa, all of Kanagawa, Japan

[73] Assignee: Fuji Photo Film Co., Ltd., Kanagawa, Japan

[21] Appl. No.: 145,179

[22] Filed: Jan. 19, 1988

[30] Foreign Application Priority Data

Jan. 19, 1987 [JP] Japan .................................. 62-9718
Jan. 19, 1987 [JP] Japan .................................. 62-9719

[51] Int. Cl.$^4$ ............................................. G03B 27/80
[52] U.S. Cl. ................................................... 355/38
[58] Field of Search ................... 355/38, 35, 77, 68, 355/83; 358/76, 75, 77, 78, 80

[56] References Cited

U.S. PATENT DOCUMENTS

| | | | |
|---|---|---|---|
| 4,371,259 | 2/1983 | Howitt | 355/38 |
| 4,668,082 | 5/1987 | Terashita et al. | 355/38 X |
| 4,693,596 | 9/1987 | Shigaki | 355/38 X |
| 4,704,026 | 11/1987 | Rauh et al. | 355/38 |
| 4,707,120 | 11/1987 | Yamamoto | 355/38 |
| 4,710,019 | 12/1987 | Terashita | 355/38 |
| 4,757,351 | 7/1988 | Birgmeir | 355/38 |
| 4,769,695 | 9/1988 | Terashita | 355/38 X |

Primary Examiner—Richard A. Wintercorn
Attorney, Agent, or Firm—Sughrue, Mion, Zinn, Macpeak, and Seas

[57] ABSTRACT

An exposure determining device detects densities of a number of picture elements of a color original and displays an image of the color original on a color monitor. A part of a principal subject image of the color original is specified on the color monitor. Based on the measured color density of the specified part, picture elements by which the principal subject image is formed are detected to determine a principal subject image area. By using the detected densities of picture elements included in the prinipal subject image area, at least one image characteristic value is calculated and is used with one of a plurality of previously provided exposure calculating formulas selected according to scenes into which principal subject images are classified, in order to determine the proper exposure for reproducing color images of proper color balance and density.

22 Claims, 9 Drawing Sheets

EXPOSURE DETERMINING DEVICE FOR COLOR IMAGE REPRODUCTION

BACKGROUND OF THE INVENTION

The present invention relates to an exposure control device for use with optical reproducing apparatuses such as photographic color printers, CRT printers, laser printers, copy machines and the like, and more particularly to an exposure control device for determining a suitable exposure with which a copy of a color original is optically reproduced.

In an optical reproducing apparatus for making a faithful copy of a color original, often characteristic values of three color images of a color original are detected according to which exposures are controlled by color. For example, in a photographic color printer it is well known to control the exposures in accordance with large area transmittance densities (hereinafter referred to as LATDs) of the three colors, namely blue, green and red, of the color original from which a color print is made.

Meanwhile, based on the concept that the image quality of copies depends on the finished quality of the principal subject image of the copies, exposures usually are controlled so as to make a color print with a good quality of principal subject image. This exposure control method is found in, for example, Japanese Patent Publication No. 55-2,941. The exposure control system taught by this Japanese Patent Publication is featured by controlling the exposure of blue green and red color printing lights by using image characteristic values of the whole image area of the color original and principal image characteristic values. In this exposure control system the principal image characteristic value is obtained by specifying one including the principal subject image of a plurality of sub-areas into which the whole image is divided.

Another exposure control system is known, in which the exposures of three colors are controlled so as to make a color print with a specific part having a predetermined density the specific part being automatically determined by detecting an area of color original having a color which appears as fresh color on its positive image. One such exposure control system is taught for example, in Japanese Patent Unexamined Publication Nos. 52-156,625 and 54-68,632.

One problem with system wherein exposure is controlled based mainly on the principal subject image is that accurate exposure control is difficult to effect because the same exposure calculating formula is used for color originals having various kinds of principal subject images with different sizes and color densities. As a result, it has been difficult to obtain reproduced images with good color balance and proper image quality.

Another problem with systems wherein a principal subject image extent is determined by detecting automatically a part of an image having a flesh color is that, where the color originals include walls or furniture which have a color similar to the flesh color of the human body, they are apt to be taken for a part of the human body and to confuse gray color with flesh color. This color confusion is attributable to changes on standing in the characteristics of the film and the illumination source (day time, evening, fluorescent lamp), resulting quite often in incorrect exposure control in color image reproduction.

SUMMARY OF THE INVENTION

Accordingly, one object of the present invention is to provide an exposure control device for determining exposures in color image reproduction so as to enable easy, highly accurate exposure control.

In accordance with the present invention, an exposure determining device comprises means for inputting image information on particular characteristics of a principal subject image of a color original to be reproduced, means for specifying a particular point of the principal subject image displayed on a color monitor, means for determining a predetermined size of principal subject image area having its center at the specified point on the principal subject image, means for calculating image characteristic values based on color densities of picture elements of which the principal subject image consists, and means for calculating exposures by using at least the calculated image characteristic values of the principal subject image with an exposure calculating formula selected according to the principal subject image.

According to a preferred embodiment of the present invention, the exposure control device further comprises means for determining a background image area which is defined by a whole area excepting the principal subject image area or a part of the whole area. The image characteristic values are obtained for each image area or extent based on the densities of picture elements by which each image area or extent is defined. The color image reproducing exposures are obtained by adding together three exposures; namely, basic exposures, compensation exposures and correction exposures. The basic exposure is calculated based on the image characteristic value by the use of a basic exposure calculating formula: and the compensation exposure is calculated based on the principal subject image characteristic value by the use of a plurality of exposure calculating formulas selected according to the classified scenes of the principal subject images and the correction exposure based on the density level of the principal subject image.

According to another preferred embodiment of the present invention, the principal subject image area is determined by specifying an outline of a principal subject image and detecting picture elements included within the outline.

According to still another embodiment of the present invention, the image information input means includes means for inputting information on classified scene size and density level of the principal subject image. The judging area for the principal subject image is determined based on the specified point and the size of the principal subject image. Means is further provided to define limits of picture elements by which the principal subject image is detected. The definition of the limits of picture elements is effected based on a density of the specified point and the classified scene of the principal subject image. In this embodiment, the principal subject image area is determined by detecting picture elements within the judging area which are included within the limits.

DESCRIPTION OF THE DRAWINGS

The foregoing and other objects and features of the present invention will be described below with reference to the accompanying drawings, in which.

DETAILED DESCRIPTION OF THE PREFERRED EMBODIMENTS

Figure 1:
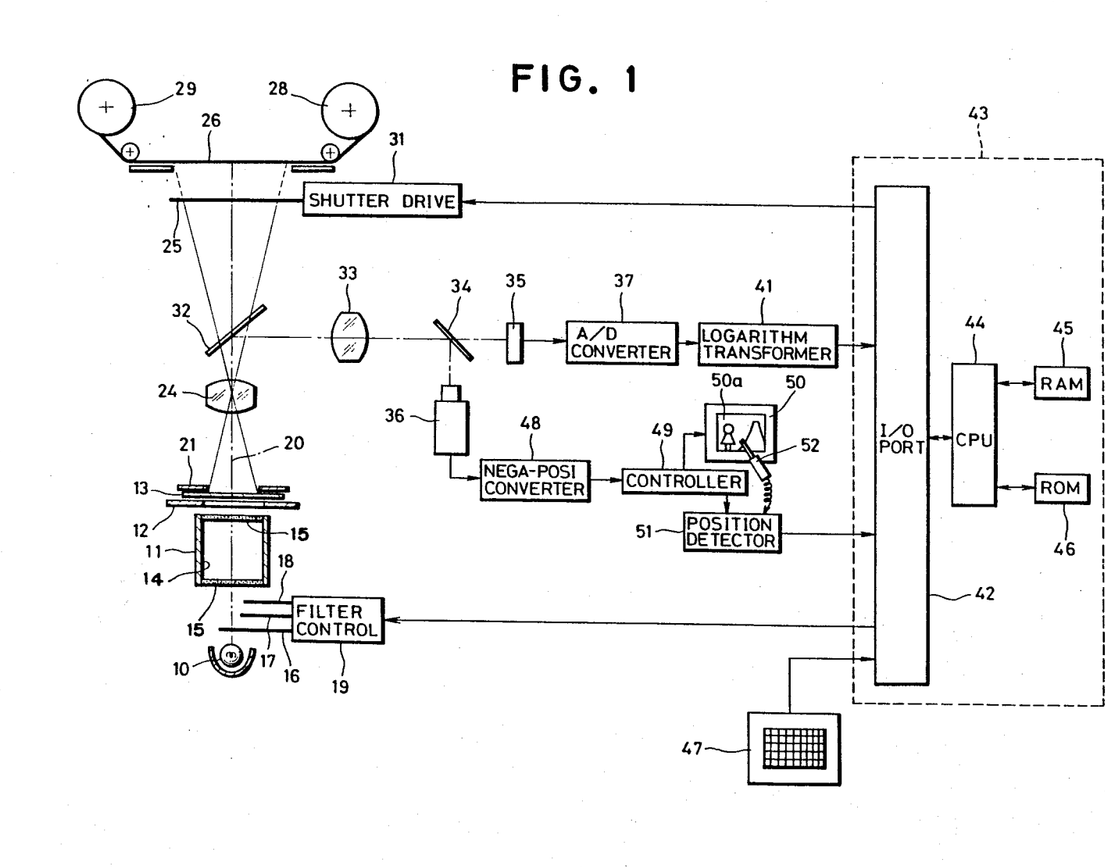
FIG. 1 is a schematic view of a color printer to which the present invention ma be applied.

Referring now to FIG. 1 showing a color printer with which a device according to the present invention is applied, there are three complementary color filters 16, 17, 18, namely, cyan. magenta and yellow. Each color filter 16, 17, 18 may be inserted, independently of the other two, between an illumination lamp 10 and a mirror box 11 which comprises a square hollow tube 14 having inner mirrored walls and top and bottom diffusion plates 15. The white light from the lamp 10 passes through the color filter 16, 17 or 18 into the mirror box 11 and is diffused thereby. After passing through a color original or color negative 13 placed between a negative carrier 12 and a mask member 21 so as to be held flat in an exposure position, the diffused light is focused on a color paper 26 by means of the enlarging lens 24 to create a latent image of the color original 13 in accordance with the operation of a shutter 25 which is controlled by a shutter control 27 to open for a certain time, to provide a standardized exposure. After exposure, the exposed color paper 26 is wound up on a take-up reel 28 and an unexposed part thereof is withdrawn from a supply reel 29 and placed in the exposure position.

In the optical light path 20, a half-mirror 32 is disposed at an angle (45° in this embodiment) to reflect the illumination light and then to direct it to another half-mirror 34. Thus, the light is divided into two beams, namely the light reflected toward a color TV camera 36 and the light transmitted to a color scanner 35 consisting of an image area sensor 35 which is well known in the art. The lens 33 in front of the half-mirror 34 focuses the image of the color original 13 on the image sensor 35. From this image sensor 35, red, green and blue color signals can be extracted for each picture element of the color original. The respective red, green and blue color signals from the image sensor 35 are transferred to an A/D converter 37 and converted into digital signals which are logarithmically transformed into corresponding color density signals by a logarithmic transformer 41. The color density signals are transferred into microcomputer 43 through I/O port 42. The half-mirror 32 is preferably removed from the optical path 20 upon color signal detection by the image sensor 35 in order to effectively utilize the light from the lamp The microcomputer 43 is well known, and comprises the I/O port 42, a CPU 44, a RAM 45 and a ROM 46, to control the operations of components as well as to calculate exposures, as will be described later. The RAM 45 stores the color density signals separately by color. In connection with the microcomputer, a keyboard 47 is provided to instruct the respective components to operate under control of the microcomputer 43 and to enter information relating to the type, size, and density level of principal subject images into the microcomputer 43.

The color TV camera 36 picks up the color negative images of the color original 13 and produces video signals. These video signals from the color TV camera 36 are transferred to a negative-positive converter 48 and converted into positive video signals. The positive video signals then are transferred through a controller 49 to a color monitor 50 in order to display the positive image on a screen 50a. The controller 49 is adapted to produce, based on synchronizing signals, position signals which in turn are sent to a position detecting section 51.

On the other hand, an operator visually observes the positive image on the screen 50a of the monitor 50 and specifies a part of the positive image which is considered to be a part of a principal subject image based on that visual analysis. To actually specify the part of the principal subject image, the operator touches the part considered to be a principal subject image with a position-specifying means, for example a light pen 52 as is well known. This light pen 52 receives light from the screen 50a of the monitor 50 when the corresponding part of the monitor 50 is illuminated and photoelectrically converts the received light into a signal which in turn is sent to a position detecting section 51. As a result, position information which represents the position of the specified part on the positive image touched by the light pen 52 is given to the microcomputer 43.

Although, in this embodiment, the image sensor 35 is utilized to detect densities of the respective picture elements, it is permissible to obtain density signals by converting the video signals produced by the color TV camera 36. In this case, the image sensor 35 can be omitted, resulting in a low cost for the exposure control device. As the position specifying means, it is possible to replace the light pen 52 by various devices, such as touch panels, joysticks, digitizers, track-balls or X-Y cursors.

Figure 2:
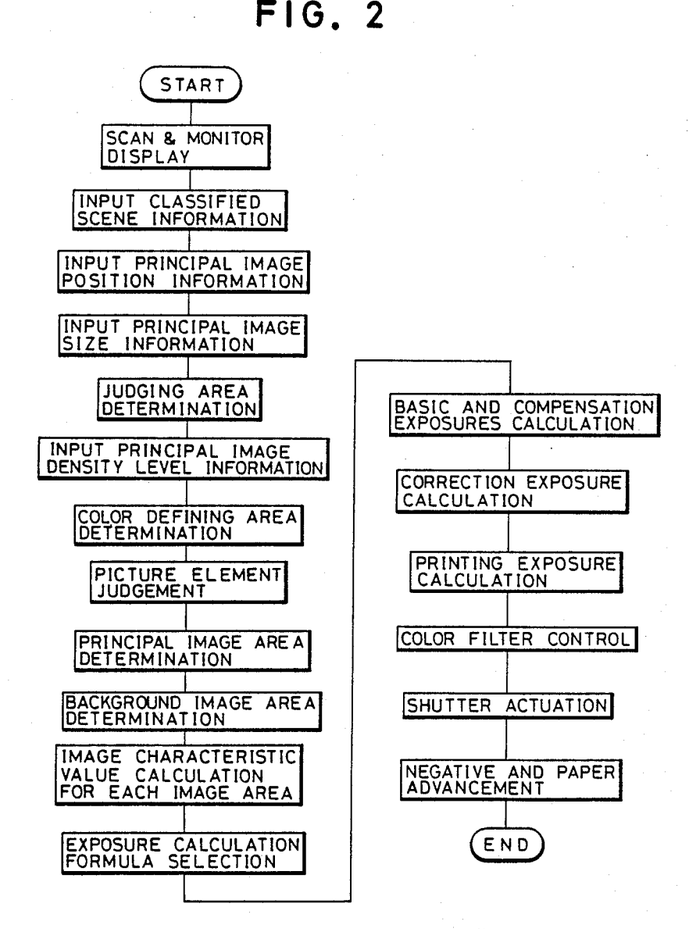
FIG. 2 is a flow chart showing a sequence of printing control on the printer of FIG. 1.

FIG. 2 shows an operation sequence of exposure control with reference to which the operation of the color printer of FIG. 1 now will be explained.

The color original or negative 13 is moved by means of a transfer mechanism (not shown) in any well known manner to place a picture frame to be printed between the negative carrier 12 and the mask member 21. At this time, each color filter 16, 17, 18 is retracted from the illumination light path 20 so as to allow a part of the white light from the lamp 10 to pass into the mirror box 11 and to be diffused thereby. The diffused light after passing through the negative 13 and the enlarging lens 24, reaches the half-mirror 32. The transmitted part of the light is focussed on the color paper 26, and the reflected part of the light is directed to the other half-mirror 34 after passing through the lens 33. The half-mirror 34 divides the light incident thereon into two beams, the transmitted light being directed toward the image sensor 35 and the reflected light toward the color TV camera 36.

The image sensor 36 scans a color negative image focussed thereon to measure each picture element of the negative image so as to detect the red, green and blue light components and, in accordance with the detected components of light, to provide red, green and blue color signals for each picture element. The color signals are converted by an A/D converter into color density signals after a logarithmic transformation and then are stored in the RAM 45 of the microcomputer 43, separately by color. On the other hand, the color TV camera 36 provides negative image video signals which, after a negative-positive transformation, are transferred to the color monitor 50 through the controller 49 so as to display the video signals as a positive image of the color original 13 on the screen 50a.

Figure 3:
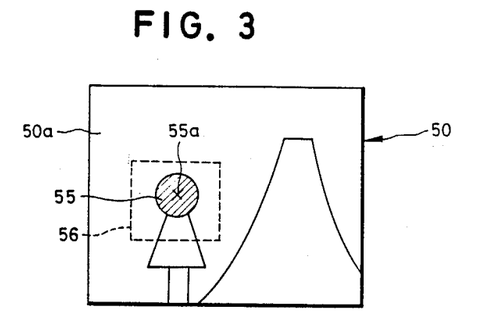
FIG. 3 is an illustration showing a screen of a color monitor used in the color printer of FIG. 1.

As is shown in FIG. 3, a principal subject image and the scene thereof is judged by observing the positive image on the color monitor 50 so as to enter information on the scene of the judged principal subject image through the keyboard 47. In this embodiment, the scene of the principal subject image 55 is judged to be a human body and, therefore, a key is operated to enter information representative of "flesh color" or "human figure". Then, a part 55a of the principal subject image 55 is specified by the use of the light pen 52 so as to be detected in position by the position detector 51. Position information for the designated part 55a of the principal image 55 is transferred to the microcomputer 43.

After specifying the position for the principal subject image 55, size information for the principal subject image is entered through the keyboard 47. The size of principal subject image is classified generally as either "large" and "small". According to principal image sizes, there are previously provided two different sizes of judging areas. A judging area 56 shown by a dotted line in FIG. 3 is automatically selected by operating a key indicating "small" if the size of the principal subject image 55 is judged to be small. Usually, the judging areas is rectangular and has its center at the position of the part 55a designated by the light pen 52. The judging area also may be a circle, an ellipse, a rhombus or the like.

As the next sequential operation, information on density should be entered according to the density of the principal subject image through the keyboard 47. Generally, various principal subject images are classified into three density levels, namely "deep", "average" and "light". This density level may be determined according to either a density which is anticipated based on specific characters of the principal subject image or an actual density of the principal subject image displayed on the color monitor.

Figure 4:
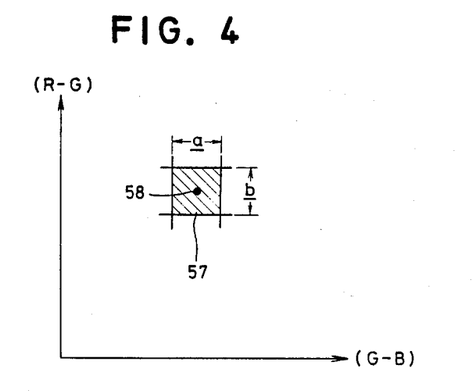
FIG. 4 is an explanatory illustration showing a color defining area.

Referring to FIG. 4, there is shown a color definition area 57 which defines particular colors having a density similar to that of the specified part 55a of the principal subject image 55. A picture element which has a color falling within the color defining area 57 is recognized to be one of the picture elements of the principal subject image 55. The color defining area 57 has to be fixed in extent according to the classified scenes of principal subject images. For this reason, there are previously provided several sizes of color defining areas according to the classified scenes of principal subject images. For determining the color defining areas, it is convenient to use a chromaticity coordinate system, shown in FIG. 4, whose axes represent differences between two color densities, namely, between red and green densities (R-G), and between green and blue densities (G-B). In this system, the color defining area 57 is determined around a point 58 which represents a chromaticity of the specified part 55a. Values a and b by which the rectangular color defining area 57 is defined are pre-fixed according to the classified scenes of principal subject images. For example, a color defining area has maximum values of a and b for a principal subject image which is either a human body or a flesh colored object and minimum values of a and b for a principal subject image other than a human figure or a flesh colored object. Although the color defining area shown in FIG. 4 has been determined based on colors, nevertheless it may be determined based on densities or the like.

Figure 5:
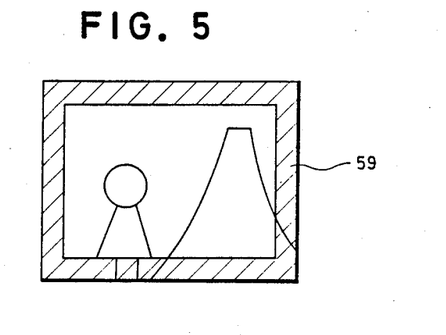
FIG. 5 is an explanatory illustration showing an example of a background image area.

After the color defining area determination, the picture elements within the judging area 56 are judged, one after another, to determine whether or not the density of each picture element has a color falling within the color defining area shown in FIG. 4. Since picture elements judged to have colors within the color defining area 57 constitute the principal subject image 55, the picture elements judged to have colors falling within the area are written in an image area memory of the RAM 45. A whole part of the image excepting the principal subject image area, a part of the whole area excepting the judging area, or the marginal area 55 of the image shown in FIG. 5 is determined as a background image area.

Sequentially, image characteristic values are calculated for each image area, namely the principal subject image area and the background image area, separately by color in order to obtain various exposures. Based on the characteristic values for the background image basic exposures $Ef_i$ (i being one of the colors red, green or blue) are calculated for controlling colors and densities of reproduced images, and based on the characteristic values for the principal subject image, compensation exposures $Ec_i$ are calculated in order to compensate exposures effected with the basic exposures $Ef_i$. Further, correction exposures $Ea_i$ are calculated based on the combination of the classified scene, size and density level of the principal subject image. Finally, actual printing exposures $E_i$ are obtained by adding together the respective exposures $E_f$, $Ec_i$ and $Ea_i$.

The resulting actual printing exposures $E_i$ for the three colors are transferred to the filter controller 19 to adjust the color filters 16-18 to control the proportion of the three color components of the printing light. If the color filters do not control the amount of the printing light sufficiently, then the shutter 25 provides additional control through the shutter controller 27.

A print start key on the keyboard 47 then is operated to start a print. The lamp 10 shines with full intensity and then the shutter 25 is opened for a certain time to effect an exposure. After the print, the color negative film 13 and the color paper 26 are respectively moved by one frame, and simultaneously, the filter controller 19 moves the color filters 16-18 back to their initial position with respect to the printing light path 20 and the lamp 10 is dimmed.

Figure 6:
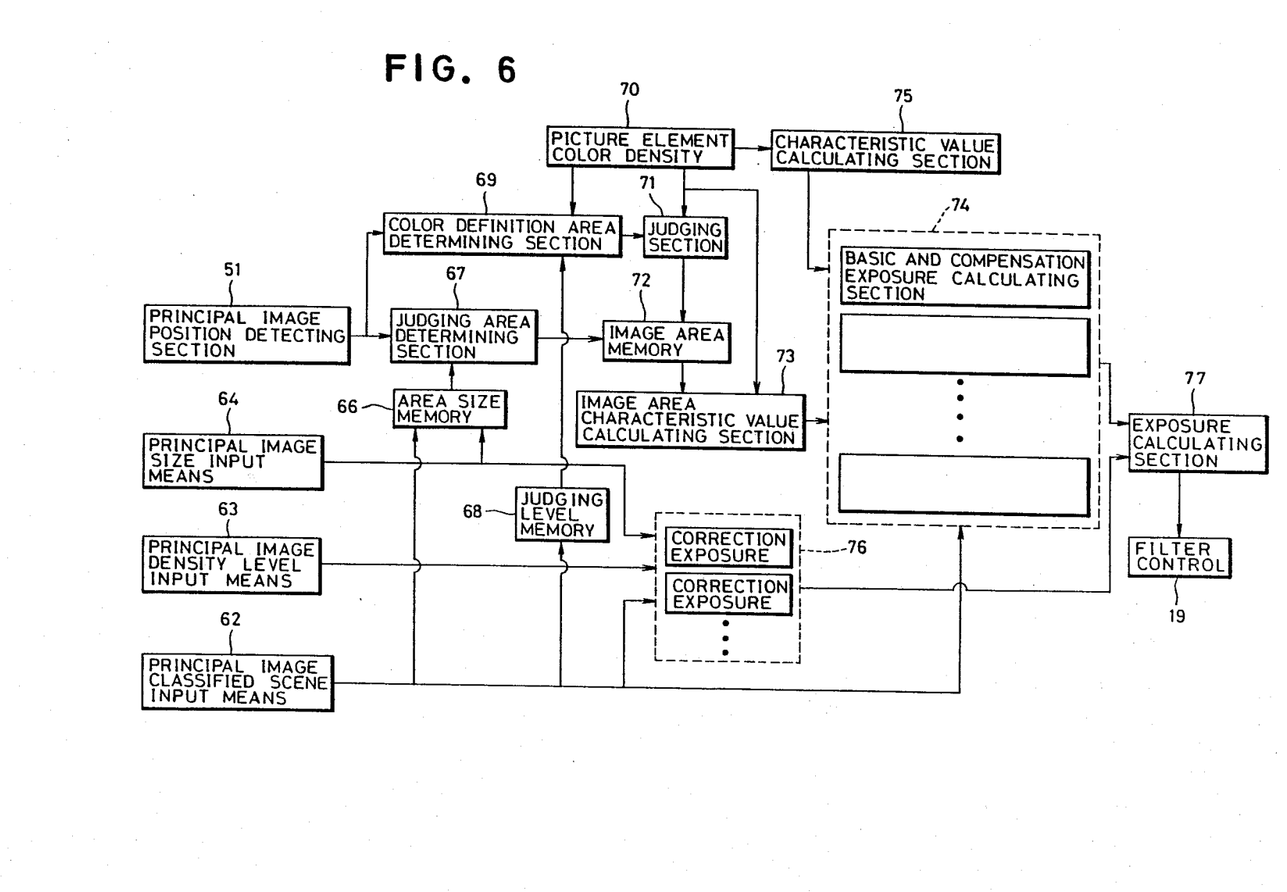
FIG. 6 is a functional diagram illustrating an example of a microcomputer used in the color printer of FIG. 1.

Referring now to FIG. 6 showing the microcomputer 43 in a functional block diagram, on the keyboard 47 there are input means 62, 63 and 64 for entering information on the classified scene, density level and size of the principal subject image, respectively. In accordance with the information input on the classified scene and size of the principal subject image entered through the respective input means 62 and 64, data on area size stored in an area size memory 66 are retrieved and transferred to a judging area determining section 67 wherein a judging area is determined so as to have its center at the position of the specified part 55a provided by the position detector 51. When entering the information on the classified scene of the principal subject image through the input means 62, the values a and b are retrieved from a judging level memory 68. A color defining area determining section 69 reads out the density of the specified part 55a of the principal subject image 55 from a memory 70 and, based on the retrieved values a and b, determines the proper size of color defining area 57 as shown in FIG. 4.

A judging section 71 reads out the density of each picture element from the memory 70 to judge whether the density of the picture element falls within the color defining area 57 of which the size has been determined by the color defining area determining section 69. Only the judged results as to picture elements included within the judging area 56 determined by the judging area determining section 67 are written in an image area memory 72. Therefore, what is written in the image area memory 72 is data on whether the picture element is included within the principal subject image area.

An image characteristic value calculation section 73 reads out data on the densities of the picture elements constructing the principal subject image 55 from the memory 70 with reference to the data stored in the image area memory 72 so as to obtain the image characteristic values for three colors, for example mean color densities of red, green and blue for the principal subject image. In the same manner, the densities of the picture elements constructing the background image are read out from the memory 70 so as to obtain mean color densities for three colors for the background image.

There is a calculating section 74 wherein there are provided various exposure calculating formulas, namely basic exposure calculating formulas and compensation exposure calculating formulas, which are selected and used according to the classified scenes of principal subject images. By substituting into the exposure calculating formulas the image characteristic values for the principal subject and background images obtained in the image characteristic value calculating section 73, and characteristic Values obtained in a characteristic value calculation section 75, for example maximum or minimum densities, contrast, or the like, the basic and compensation exposures $Ef_i$ and $Ec_i$ are calculated. It is to be noted that a common exposure calculating formula may be used to calculate the basic exposure $Ef_i$ independently from the classified scenes of principal subject images.

In a correction exposure memory 76, correction exposures $Ea_i$ are provided for various combinations of the density levels, sizes and classified scenes of various principal subject images. If no principal subject image is specified, the correction exposures $Ea_i$ are selected based on only the density levels of the principal subject image.

The basic and compensation exposures $Ef_i$ and $Ec_i$ thus obtained in the exposure calculating section 74 are transferred to a printing exposure calculating section 77 to which the correction exposures $Ea_i$ are also transmitted from the correction exposure memory 76. In the section 77, the actual printing exposures $E_i$ are calculated by adding together the three exposures. According to the resulting printing exposures $E_i$, the filter controller 19 adjusts the amount of insertion of each filter 16, 17, 18 into printing light path 20.

Figure 7:
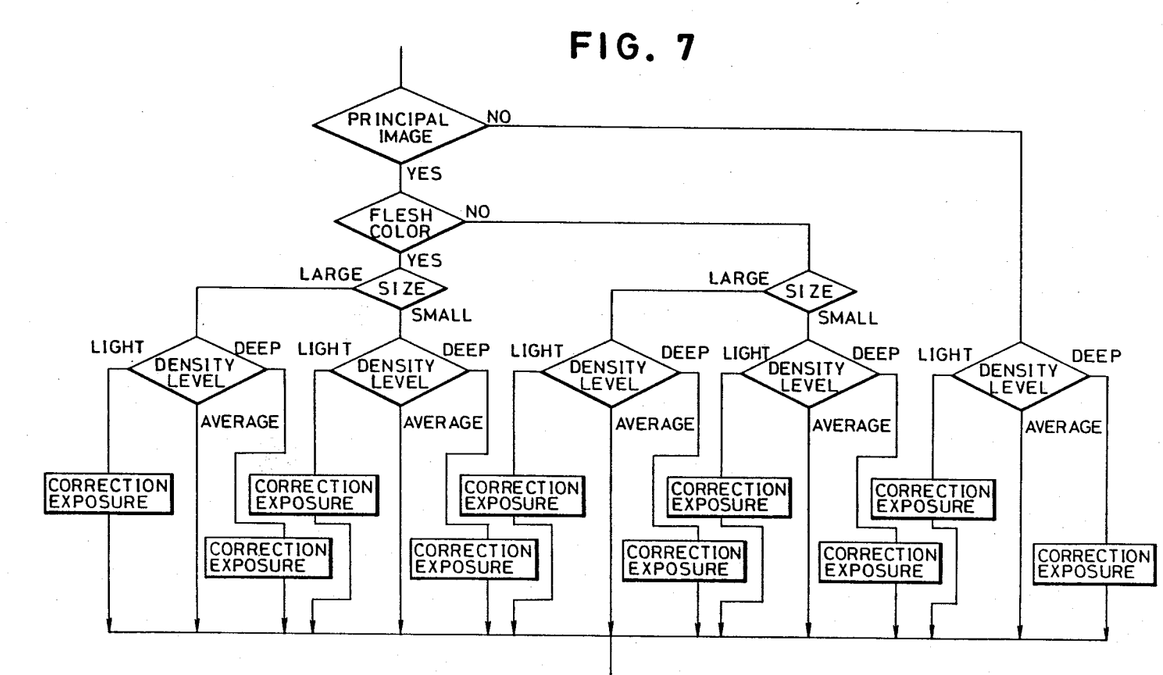
FIG. 7 is a flow chart showing a sequence of determining correction exposure.

Referring now to FIG. 7, there is shown a sequence of the determining or selecting of the correction exposures. In general, even if principal subject images are classified as having a flesh color or being a human body, they will have difference densities of flesh color for different individuals being shown. On the other hand, if principal subject images are classified as other than a flesh color or a human figure, for example white or dark color buildings, snowy scenes, or the sea, colored leaves or the like, they also have different color densities. In the case of printing from color originals including these principal subject images, printed images will have unfavorable image quality if not preferably printed based on an average mean density level. If these principal subject images have density levels higher or lower than an average density level, printed images will have unsatisfactory image quality. For this reason, it is necessary to conduct correction exposures according to the density levels of the individual principal subject images. In this case, often it is necessary to provide a large amount of correction exposure for a large size of principal subject image. Therefore it will be apparent that the correction exposures will be desirably determined based on the size and density level of principal subject image.

Color originals judged to have principal subject images may, as a first step, be classified into two groups, namely images having flesh colors and images having colors other than flesh color. The principal subject images having a flesh color can be further classified into six sub-groups according to combinations of the sizes and density levels of principal subject images. For principal subject images whose density levels are higher or lower than the average density level there are previously provided several correction exposures to be selected according to the density levels and sizes. In this case, there are provided exposure calculating formulas in correspondence with the classified scenes of principal subject images, each formula being given under the condition that the principal subject image has the average density level. In the same way, the principal subject images having colors other than flesh colors are classified into six sub-groups. On the other hand, if the color originals are judged to have no principal subject image, they are classified further into three sub-groups according to the density levels of their whole image area.

Although there are ten different correction exposures in this embodiment as is shown in FIG. 7, it may be permissible to use a calculation formula for calculating a correction exposure for each color original. For example, it may be convenient to use a functional formula including areas of high-light section and shadow section, and mean densities of the respective areas.

The determination of the actual printing exposure will be described in detail hereafter in the case that color originals are classified into three group as shown in FIG. 7. At first, when the color original to be printed is classified as having a principal subject image of flesh color mean color densities for red, green and blue of a principal subject image included within the judging area are taken for the image characteristic values. Each color mean density can be defined either by an arithmetical mean density of picture elements included within the judging area or by an intermediate density between a maximum and a minimum densities of the principal subject image within the judging area.

The compensation exposure $Ec_i$ can be calculated for each color by the use of the following general formula.

$$Ec_i = e_i' + f_i' R_p + g_i' G_p + h_i' B_p + \Sigma K_{ij} V_{ij} \qquad (1)$$

wherein the characteristic values are defined as follows
$R_p$, $G_p$, $B_p$ are mean color densities of the principal subject image for red, green and blue respectively;
$e_i'$, $f_i'$, $g_i'$, $h_i'$ are coefficients;
$V_j$ is a characteristic value such as a mean density of a whole image or a part of image, a maximum density, a minimum density; the number of terms is less than 50; and
$K_j$ is a coefficient specified for each color.

The basic exposure $Ef_i$ can be calculated for each color by the use of the following general formula.

$$Ef_i = a_i + b_i(R_s - R_{os}) + c_i(G_s - G_{os}) + d_i(B_s - B_{os}) \qquad (2)$$

wherein $R_s$, $G_s$, $B_s$ are mean color densities of the background image for red, green and blue respectively:
$a_i$, $b_i$, $c_i$, and $d_i$ are coefficients for three colors; and
$R_{os}$, $G_{os}$, $B_{os}$ are constants each of which represent a mean color density of the background image of a standard color original for each color.

Based on the exposures $Ec_i$ and $Ef_i$ calculated by the use of the formulas (1) and (2), and the correction exposure $Ea_i$ obtained according to the operation shown in FIG. 7, the actual printing exposure $E_i$ is obtained as follows:

$$E_i = Ef_i + Ec_i + Ea_i \qquad (3)$$

For color originals having principal subject images of colors other than flesh colors, the actual printing exposure $E_i$ can be obtained by using the formulas (1) and (2) but taking different values for the coefficients.

For color originals having no principal subject image based on image characteristic values of the whole image of the color original, the basic and compensation exposures $Ef_i$ and $Ec_i$ are calculated and the actual printing exposure $E_i$ is obtained by adding the resulting exposures $Ef_i$ and $Ec_i$ to the correction exposure $Ea_i$.

Figure 8:
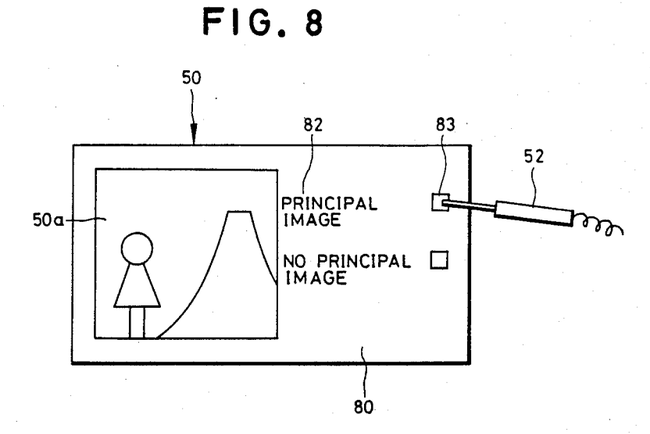
FIG. 8 is an illustration showing the color monitor which is adapted to enter information on a principal subject image.
Figure 9:
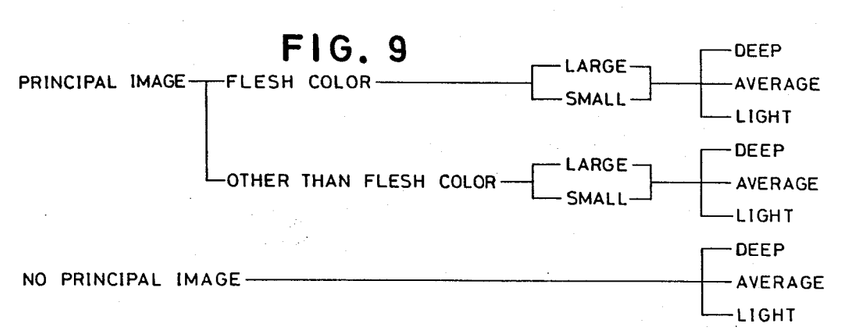
FIG. 9 is an explanatory illustration showing a sequence of menu indication.

Although, in the above described embodiment, particular image information on the classified scenes, sizes and color densities of principal subject images is entered through the keyboard 47, it may be convenient to select necessary menus displayed on the color monitor to enter the particular image information. Specifically, as is shown in FIGS. 8 and 9, the color monitor 50 is provided with a menu display section 80 on which displayed are two menus 82, "principal image" and "no principal image", for scene classification of the displayed image and selection marks 83. The operator selects either one of the selection marks 83 by touching one of them with the light pen 52 while observing the image displayed on the monitor 55.

The selecting operation is sequentially effected as is shown in FIG. 9, Firstly shown on the menu display section 81 are the principal image selection menus 82, "principal image" and "no principal image". If the selection mark 83 beside the menu indicating "principal image" is touched, the display section 81 displays color selection menus "flesh color" and "no flesh color", in place of the principal image selection menus. Therefore, one of the selection marks 83 may be touched with the light pen. After the color selection, the display section 81 displays size selection menus "large" and "small" and thereafter density level selection menus "deep", "average", and "light". In this way, the color original is precisely classified according to the color, size and density of the principal subject image.

It should be noted that the principal subject image may be classified into a desired number of divisions based on size and/or density. On the other hand, if the menu of "no principal image" is selected, the color selection menu and the size selection menu are skipped.

Although, in the above described embodiment of the present invention, color originals are classified into three scenes of principal subject images (scenes having an image with a flesh color; scenes having an image with colors other than flesh color: and scenes without a principal subject image), color originals may be classified either into two scenes with or without flesh color, or into several scenes such as images having flesh colors images of buildings, images of landscapes, images of plants, image of night views, images photographed by use of artificial illumination, or images with no principal subject image. It also should be noted that the calculating formulas for the basic and compensation exposures may be selected based on, for example, the combination of density level and image size of a principal subject image.

Figure 10:
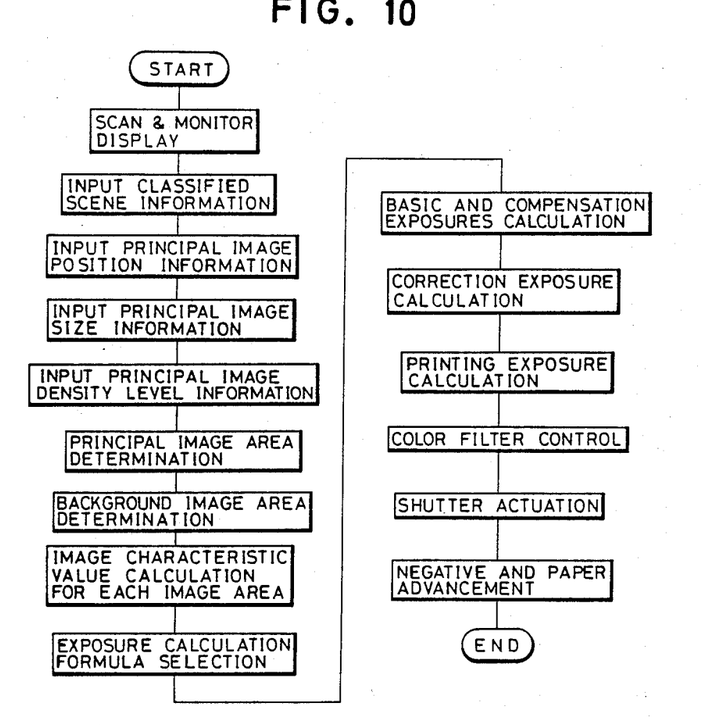
FIG. 10 is a flow chart showing a sequence of printing control on the color printer according to another embodiment of the present invention.
Figure 11:
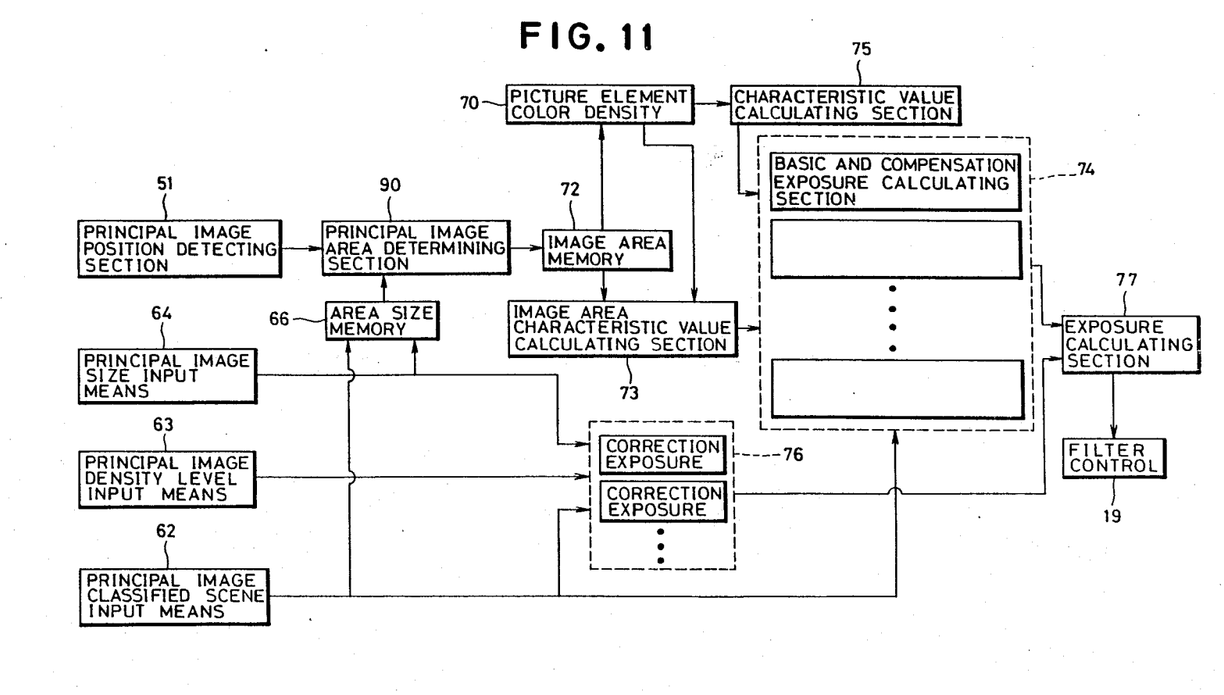
FIG. 11 is a functional diagram illustrating an example of a microcomputer used to effect the control of FIG. 10.
Figure 12:
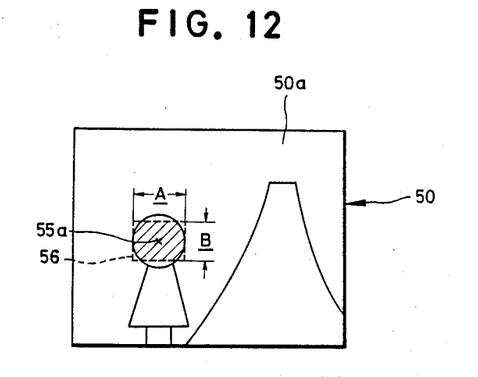
FIG. 12 is an illustration of a screen of a color monitor used in connection with the control of FIG. 10.

Referring now to FIGS. 10 to 12 there is shown another preferred embodiment of the present invention wherein the color defining area determining operation is eliminated for simplicity of construction. In this embodiment, functional elements shown in FIG. 11 and designated by the same reference numerals as in FIG. 6 are the same in construction and function and, therefore, no description is needed. Due to this elimination, there is not provided in the microcomputer 43 the functional elements such as the judging area determining section 67, the judging level memory 68, the color defining area determining section 69 and the judging section 71 of the previously described embodiment shown, in particular, in FIG. 6. In this embodiment, by inputting information on the classified scene and size of a principal subject image, numerical values A and B are retrieved from the image area memory 66 and transferred to the principal image area determining section 90. The principal image area determining section 90 determines, on the basis of the inputted information, a principal image area 56 having it center at the position 55 of the specified part of the principal subject image specified on the monitor 50. The remaining part excepting the principal subject image or a part of the remaining part is determined as a background image area.

The values A and B defining the principal subject image areas are previously provided according to the sizes and classified scenes of principal subject images. For example, if the size of the principal subject image is "large", the maximum values of A and B are retrieved and, on the other hand, if the size is "small", the minimum values A and B are retrieved.

The size of the principal subject image area may be predetermined in accordance with the classified scene of principal subject images. For example, the principal subject image area determining section selects a small size of principal subject image area for principal subject images of flesh color or human body and a large size of principal subject image area for principal subject images other than the flesh color or human body principal subject image.

The printing exposure determination and printing operation is performed in this embodiment in the same sequential manner as in the previously described embodiment and, therefore, no description is needed.

Figure 13:
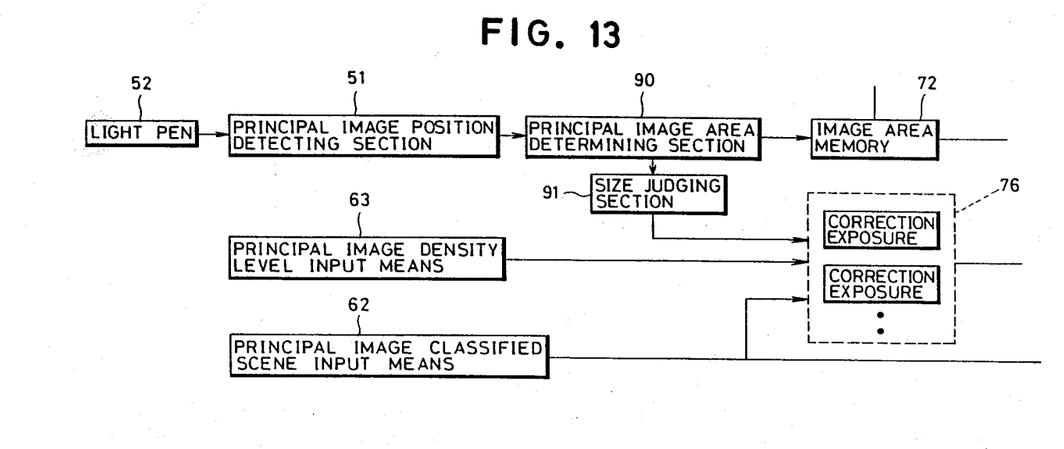
FIG. 13 is a functional diagram partly illustrating an example of a microcomputer used in another color printer embodiment.

FIG. 13 shows another embodiment of the present invention wherein an outline of the principal subject image, rather than a part of the image, is specified on the color image monitor 50. For specifying the outline of the principal subject image, the light pen 52 also is used. Information on positions of the outline is transferred to the principal subject image determining section 90 through the position detector 51. The principal subject image determining section 90 detects picture elements included within the outline to determine a principal subject image area. Data of picture elements of the principal subject image area are transferred to the image area memory 68.

Data of the principal subject image area determined in the principal subject image are determining section 90 is transferred to size judging section 91, which judges whether the size of the principal subject image area is "large" or "small". The size judging is effected by judging whether the number of picture elements in the principal subject image area is larger or smaller than a predetermined average number. If the number of the picture elements is larger than the predetermined average number, the size of the principal subject image area is judged to be "large" and, on the other hand, if smaller, the size is judged to be "small".

Although the present invention has been fully described by way of the preferred embodiments, it is apparent that the present invention can be embodied in other apparatuses, such as color negative inspection apparatuses, color copy machines, laser color machines, CRT color printers, or the like which require highly accurate reproduction of principal subject images.

Of course, it will be understood that various changes and modifications will be apparent to those skilled in the art. Such changes and modifications there are within the scope of the present invention, as measured by the appended claims, which follow immediately.

What is claimed is:

1. A device for determining color image reproducing exposures for red, green and blue by using a plurality of exposure calculating formulas which are selected in accordance with scenes into which principal subject images or various color originals to be reproduced are classified, said device comprising,
    a color image monitor for displaying images of said color originals to be reproduced;
    a scanner for detecting three color densities of each picture element of said color originals, separately by color;
    scene information inputting means for inputting information on said classified scenes of said principal subject images of said color originals;
    position specifying means for specifying positions of respective parts of said principal subject images on said color image monitor;
    image area determining means for determining a predetermined size of area having a center at said specified position for each of said principal subject images;
    characteristic value calculating means for calculating image characteristic values for said principal subject images in accordance with said three color densities of picture elements by which said principal subject images are defined:
    exposure calculating means for calculating exposures by color in accordance with at least said calculated image characteristic values for said principal subject images by using one of said exposure calculating formulas which is selected in accordance with said classified scene of said principal subject image.

2. A device as defined in claim 1, wherein said image area determining means determines said principal subject image areas by selecting one of a plurality of image areas previously provided in accordance with said classified scenes.

3. A device as defined in claim 2, wherein said previously provided image areas include at least large and small areas for each said classified scene.

4. A device as defined in claim 3, wherein each said classified scene is classified into at least two groups, one group including a flesh-colored image and the other group including a non-flesh-colored image.

5. A device for determining color image reproducing exposures for red, green and blue by using a plurality of exposure calculating formulas which are selected in accordance with scenes into which principal subject images of various color originals to be reproduced are classified, said device comprising:
    a color image monitor for displaying images of said color originals to be reproduced;
    a color scanner for detecting densities of each picture element of said color originals, separately by color;
    scene information inputting means for inputting information on said classified scenes of said principal subject images of said color originals;
    specifying means for specifying positions of respective parts of said principal subject images on said color image monitor;
    principal image area determining means for determining a predetermined size of area having a center at said specified position for each of said principal subject images;
    background image area determining means for determining a whole area, excepting said principal subject image area or a part of said whole area, as a background image area for a background image;
    characteristic value calculating means for calculating image characteristic values for said principal subject image area and said background image area in accordance with corresponding picture element densities included therein;
    basic exposure calculating means for calculating basic exposure values for three colors based on said calculated image characteristic values of said principal subject image and said background image by using a basic exposure calculating formula;
    compensation exposure calculating means for calculating compensation exposures values based on said calculated principal subject image characteristic values by using compensation exposure calculating formulas which are selected in accordance with said classified scenes of said principal subject images;

correction exposure calculating means for calculating correction exposure values based on at least a density level of said principal subject images; and means for adding together said basic, compensation and correction exposure values to obtain actual color image reproducing exposures.

6. A device as defined in claim 5, wherein said density levels of said principal subject images are classified at least a deep density group and a light density group.

7. A device as defined in claim 5, wherein each said classified scene is classified into at least two groups, one group including a flesh-colored image and the other group including a non-flesh-colored image.

8. A device for determining color image reproducing exposures for red, green and blue by using a plurality of exposure calculating formulas which are selected in accordance with scenes into which principal subject images of various color originals to be reproduced are classified, said device comprising:

a color image monitor on which images of said color original ar displayed;

a color scanner for detecting three color densities of each picture element of said color originals;

scene information input means for inputting information on said classified scenes of said principal subject images of said color originals;

area specifying means for specifying outlines of said principal subject images on said color image monitor;

principal subject image area determining means for determining areas for said principal subject images in accordance with picture elements included within corresponding ones of said outlines;

background image area determining means for determining a whole area, excepting said principal subject image area or a part of said whole area, as a background image area for a background image;

characteristic value calculating means for calculating image characteristic values for said principal subject image area and said background image area in accordance with said three color densities of picture elements by which said principal subject and background image areas are defined;

basic exposure calculating means for calculating basic exposure values for three colors based on said calculated image characteristic values of both said image areas by using a basic exposure calculating formula;

compensation exposure calculating means for calculating compensation exposure values for said three colors based on said image characteristic values of said principal subject image area by using compensation exposure calculating formulas which are selected in accordance with said classified scenes of said principal subject images;

correction exposure calculating means for calculating correction exposure values for said three colors in accordance with at least a density level of said principal subject images; and means for adding said basic, compensation and correction exposures values by color to obtain actual exposures for said three colors.

9. A device as defined in claim 8, wherein each said classified scene is classified into at least two groups, one group including a flesh-colored image and the other group including a non-flesh-colored image.

10. A device as defined in claim 9, wherein said density levels of said principal subject images are classified at least a deep density group and a light density group.

11. A device for determining color image reproducing exposure values for red, green and blue by using a plurality of exposure calculating formulas which are selected in accordance with scenes into which principal subject images of various color originals to be reproduced are classified, said device comprising:

a color image monitor for displaying images of said color original to be reproduced;

a scanner for detecting three color densities of each picture element of each of said color originals, separately by color;

image information inputting means for inputting image information on said principal subject image of said each of said color originals;

specifying means for specifying positions of respective parts of each of said principal subject images on said color image monitor;

image area determining means for determining a principal subject image area by detecting picture elements having at least colors or color densities similar to that of said specified positions;

characteristic value calculating means for calculating image characteristic values for said principal subject image area;

exposure calculating means for calculating said three color image reproducing exposure values by substituting said calculated image characteristic values in said selected exposure calculating formula.

12. A device as defined in claim 11, wherein said image information comprises information on said classified scene of said each of said principal subject images.

13. A device as defined in claim 12, wherein each said classified scene is classified into at least two groups one group including a flesh-colored image and the other group including a non-flesh-colored image.

14. A device as defined in claim 11, wherein said principal subject images are classified in accordance with scenes to be reproduced and sizes thereof.

15. A device as defined in claim 14, wherein each said classified scene is classified into at least two groups one group including a flesh-colored image and the other group including a non-flesh-colored image.

16. A device as defined in claim 15, wherein said principal subject images are classified into at least two groups in accordance with size, one group corresponding to a large size and the other group corresponding to a small size.

17. A device as defined in claim 11, wherein said principal subject images are classified in accordance with scenes to be reproduced and density levels thereof.

18. A device as defined in claim 17, wherein said density levels of said principal subject images are classified at least a deep density group and a light density group.

19. A device as defined in claim 18, wherein each said classified scene is classified into at least two groups, one group including a flesh-colored image and the other group including a non-flesh-colored image.

20. A device for determining color reproducing exposures for red, green and blue by using a plurality of exposure calculating formulas which are selected in accordance with scenes into which principal subject images of various color originals to be reproduced are classified, said device comprising:

a color monitor for displaying images of said color originals to be reproduced;

a scanner for detecting three color densities of each picture element of said color originals, separately by color;

scene information inputting means for inputting information on said classified scenes of said principal subject images of said color originals;

image size information inputting means for inputting information on a size of each of said principal subject images;

density level information inputting means for inputting information on a density level of said each of said principal subject images;

position specifying means for specifying a position of a part of said each of said principal subject images on said color image monitor;

judging area determining means for determining a judging area for said each of said principal subject images in accordance With said specified position and said size of said each of said principal subject images;

means for determining a color definition area on each of said classified scenes of said principal subject images and a density of said specified position said color definition area defining particular colors of picture elements by which said each of said principal subject images is defined;

principal subject image area determining means for determining an area for said each of said principal subject images by detecting picture elements having colors or densities falling within said color definition area included in said judging area;

calculating means for calculating characteristic values for said each of said principal subject images in accordance with said picture elements included in said principal subject image area;

compensation exposure calculating means for calculating basic exposure values for said three colors based on said principal subject image characteristic values by using an exposure calculating formula selected in accordance with said classified scene of said principal subject image;

calculating means for calculating characteristic values for a background image area which is defined by a whole area excepting said principal subject image area or a part of said whole area;

basic exposure calculating means for calculating basic exposure values for said three colors based on said background image characteristic values;

correction exposure calculating means for calculating correction exposure values for said three colors in accordance with a combination of said classified scene, size and density level of said principal subject image; and means for adding together said basic, compensation and correction exposure values by color to obtain said color image reproducing exposures for said three colors.

21. A device as defined in claim 20, wherein each said classified scene is classified into at least two groups, one group including a flesh-colored image and the other group including a non-flesh-colored image.

22. A device as defined in claim 21, further comprising a memory for storing said correction exposures wherein said correction exposures are previously provided in said memory according to said combination.

* * * * *